United States Patent
Lee et al.

(10) Patent No.: US 10,014,764 B1
(45) Date of Patent: Jul. 3, 2018

(54) METHOD FOR CONTROLLING INVERTER

(71) Applicant: LSIS CO., LTD., Anyang-si, Gyeonggi-do (KR)

(72) Inventors: Jae-Moon Lee, Anyang-si (KR); Chun-Suk Yang, Anyang-si (KR)

(73) Assignee: LSIS CO., LTD., Anyang-si, Gyeonggi-Do (KR)

( * ) Notice: Subject to any disclaimer, the term of this patent is extended or adjusted under 35 U.S.C. 154(b) by 0 days.

(21) Appl. No.: 15/847,299

(22) Filed: Dec. 19, 2017

(30) Foreign Application Priority Data

Dec. 26, 2016 (KR) .................. 10-2016-0179241

(51) Int. Cl.
*H02M 7/5395* (2006.01)
*H02M 1/32* (2007.01)
*H02P 27/08* (2006.01)
*H02M 5/458* (2006.01)

(52) U.S. Cl.
CPC .......... *H02M 1/32* (2013.01); *H02M 5/4585* (2013.01); *H02M 7/5395* (2013.01); *H02P 27/08* (2013.01)

(58) Field of Classification Search
CPC ...... H02M 7/53; H02M 7/537; H02M 7/5387; H02M 7/53871; H02M 7/53873; H02M 7/53875; H02M 2007/53876; H02M 7/539; H02M 7/5395
See application file for complete search history.

(56) References Cited

U.S. PATENT DOCUMENTS

| 5,247,237 A | 9/1993 | Koyama et al. | |
| 8,823,302 B2* | 9/2014 | Hashimoto | H02P 27/045 318/400.07 |
| 9,610,972 B2* | 4/2017 | Ajima | B62D 5/046 |
| 2014/0247003 A1* | 9/2014 | Yamasaki | G05B 19/00 318/802 |

FOREIGN PATENT DOCUMENTS

| EP | 2043252 A1 | 1/2009 |
| JP | H06284787 A | 10/1994 |
| JP | H0767311 B2 | 7/1995 |
| JP | 2000201484 A | 7/2000 |
| KR | 101552771 B1 | 9/2015 |
| WO | 97/50162 | 12/1997 |
| WO | 2016/121113 A1 | 8/2016 |

OTHER PUBLICATIONS

European Search Report for related European Application No. 17206905.6; report dated May 4, 2018; (8 pages).

* cited by examiner

*Primary Examiner* — Gary L Laxton
(74) *Attorney, Agent, or Firm* — K&L Gates LLP

(57) ABSTRACT

Disclosed herein is a method for controlling an inverter. The method includes calculating a maximum current from an output current of each phase of the inverter; determining a variable level upper limit by performing a DQ conversion for the output current of each phase of the inverter and adding a change allowable value to the DQ converted output current; determining a difference between the maximum current for each phase and the variable level upper limit as an output frequency attenuation variation, when the output current of the inverter arrives at the variable level upper limit; and determining an output frequency based on the output frequency attenuation variation.

5 Claims, 9 Drawing Sheets

METHOD FOR CONTROLLING INVERTER

CROSS-REFERENCE TO RELATED APPLICATIONS

This application claims the priority of Korean Patent Application No. 10-2016-0179241 filed on Dec. 26, 2016, in the Korean Intellectual Property Office, the disclosure of which is hereby incorporated by reference in its entirety.

BACKGROUND

1. Technical Field

The present disclosure relates to a method for controlling an inverter.

2. Description of the Related Art

Typically, an inverter receives AC mains electricity to converter it into a DC power, and then converts it again into an AC power suitable for electric motors to supply it. Such an inverter effectively controls an electric motor, thereby reducing the power consumption of the motor to improve energy efficiency.

FIG. 1 is a schematic configuration view of a general inverter.

An inverter 100 receives an AC power of three phases, the rectifying unit 110 converts such an AC voltage into a DC voltage, a DC link capacitor 120 stores the DC voltage as a DC link voltage, and an inverter unit 130 then converts the DC link voltage into the AC voltage to drive a motor 200. The inverter 100 is typically controlled by a variable voltage variable frequency (VVVF) manner, and the inverter unit 130 varies magnitude and frequency of a voltage which is input to the motor 200 according to a pulse width modulation (PWM) output to control a speed of the motor 200.

A slip frequency of the motor 200 is defined as a difference between a command frequency generated by the inverter 100 and a speed of revolution of the motor 200, and when the slip frequency of the motor 200 is greatly increased, an over-current is generated and the inverter 100 or the motor 200 is damaged. Since the inverter 100 has a protection solution for the over-current, a controller suppresses the over-current or generates a trip when the over-current is generated, thereby protecting the inverter 100 or the motor 200.

FIG. 2 illustrates a current level for describing an inverter control for an over-current protection.

An over-current protection level of the a general-purpose inverter includes a software over-current suppression (S/W OCS) level, a hardware over-current suppression (H/W OCS) level that temporarily blocks PWM of the inverter 100, and an over-current (OC) trip level that stops a driving of the inverter, and the levels are compared with each other as illustrated in FIG. 2. A method for protecting an over-current of the general-purpose inverter includes a slip frequency attenuation of the motor, a temporary output block of the inverter (H/W OCS operation), and a trip stop of the inverter.

Among them, the S/W OSC operation refers to reduce the slip frequency of the motor by attenuating an output frequency of the inverter when the controller of the inverter monitors an output current of the inverter and the output current of the inverter is increased to the S/W OCS level or more. The S/W OCS level is generally a fixed level of a rated current or more of the inverter.

In addition, the H/W OCS operation refers to attenuate the output current of the inverter by temporarily blocking an output of the inverter by the controller when an input current is higher than the H/W OCS level. The controller of the inverter receives a peak of the maximum value of a three-phase output current of the inverter 100 and senses a hardware signal generated at a predetermined current level or more, and the H/W OCS level is generally higher than the S/W OCS level.

Finally, according to the trip stop method of the inverter, when the output current of the inverter is an OC trip level or more, the controller generates a trip signal and stops a driving of the inverter. The OC trip level is higher than the H/W OCS level, and stops the inverter to protect the inverter and the motor when a sharp current increase such as a short-circuit of the output of the inverter occurs.

In the control methods as described above, the conventional S/W OCS level is fixed above the rated current of the inverter. The S/W OCS operation is performed after the controller of the inverter senses the over-current through a current detection, and is thus delayed according to a filter constant and a current calculation time of the a current detection circuit. Therefore, when the over-current is generated before it is detected that the output current of the inverter arrives at the S/W OCS level due to rapid acceleration of the inverter, the output current of the inverter is increased up to the H/W OCS level or the OC trip level, and thermal stress occurs in the inverter and the motor due to the over-current.

In addition, when the S/W OCS level is low, the over-current generated by the increase of the slip frequency of the motor is detected before the H/W OCS level, thereby making it possible to suppress the over-current through the attenuation of the output frequency of the inverter. In this case, however, a continuous overload operation may be limited by the S/W OCS level. In addition, when the S/W OCS level is high, the continuous overload operation of the inverter may be increased, but since a S/W OCS detection time is limited, the current may be increased up to the H/W OCS level or the OC trip level when the slip frequency is rapidly changed by the rapid acceleration of the inverter.

Meanwhile, a three-phase output current of a single-phase input type inverter causes unbalance due to a DC link voltage ripple. FIG. 3 is a waveform view for illustrating unbalance of an output current in a single-phase input type inverter.

Since the H/W operation is based on the peak of the maximum value of the three-phase output current of the inverter, a margin between the H/W OCS level and the S/W OCS level is decreased when the unbalance 3A of the three-phase output current occurs and the H/W OCS operation occurs more frequently than the three-phase input type inverter having a relatively small unbalance of the three-phase output current. Since the H/W OCS operation is a method that temporarily blocks the output of the inverter, the slip frequency of the motor may be highly increased when large backward torque is applied during a blocking time, and the motor 200 may be stopped when a continuous H/W OCS operation occurs.

SUMMARY

It is an object of the present disclosure to provide a method for controlling an inverter in which a software over-current suppression operation level is varied according to an output current level of the inverter.

Objects of the present disclosure are not limited to the above-described objects and other objects and advantages can be appreciated by those skilled in the art from the following descriptions. Further, it will be easily appreciated that the objects and advantages of the present disclosure can be practiced by means recited in the appended claims and a combination thereof.

In accordance with one aspect of the present disclosure, a method for controlling an inverter may include calculating a maximum current from an output current of each phase of the inverter; determining a variable level upper limit by performing a DQ conversion for the output current of each phase of the inverter and adding a change allowable value to the DQ converted output current; determining a difference between the maximum current for each phase and the variable level upper limit as an output frequency attenuation variation, when the output current of the inverter arrives at the variable level upper limit; and determining an output frequency based on the output frequency attenuation variation.

In the determining of the variable level upper limit, a variable level lower limit may be further determined by subtracting a variable level band from the variable level upper limit.

The method may further include maintaining the output frequency when the output current of the inverter is increased from the variable level lower limit to the variable level upper limit.

The method may further include increasing the output frequency according to a setting to be increased up to a target frequency level when the output current of the inverter is reduced to the variable level lower limit or less.

The method may further include maintaining the output frequency at a target frequency level, when the output current of the inverter maintains the variable level lower limit.

DETAILED DESCRIPTION

Figure 1:
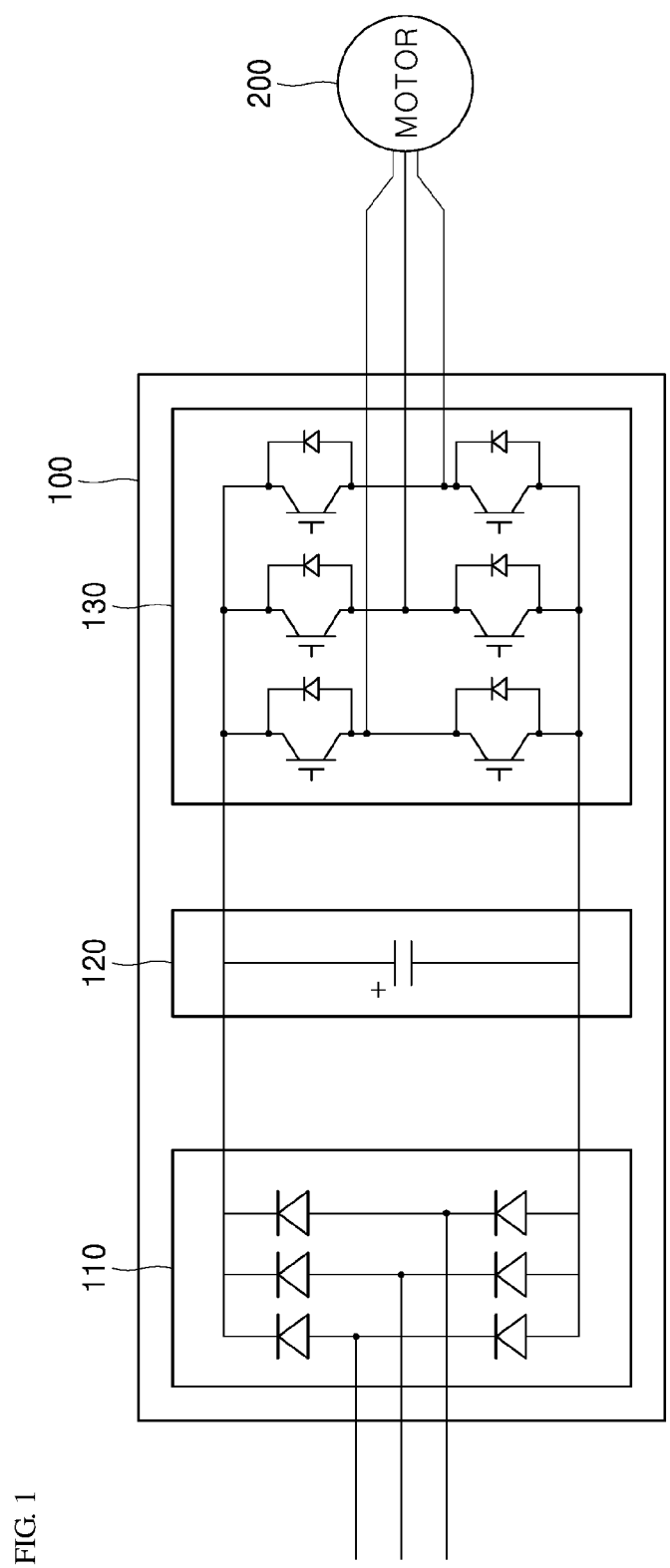
FIG. 1 is a schematic configuration view of a general inverter.
Figure 2:
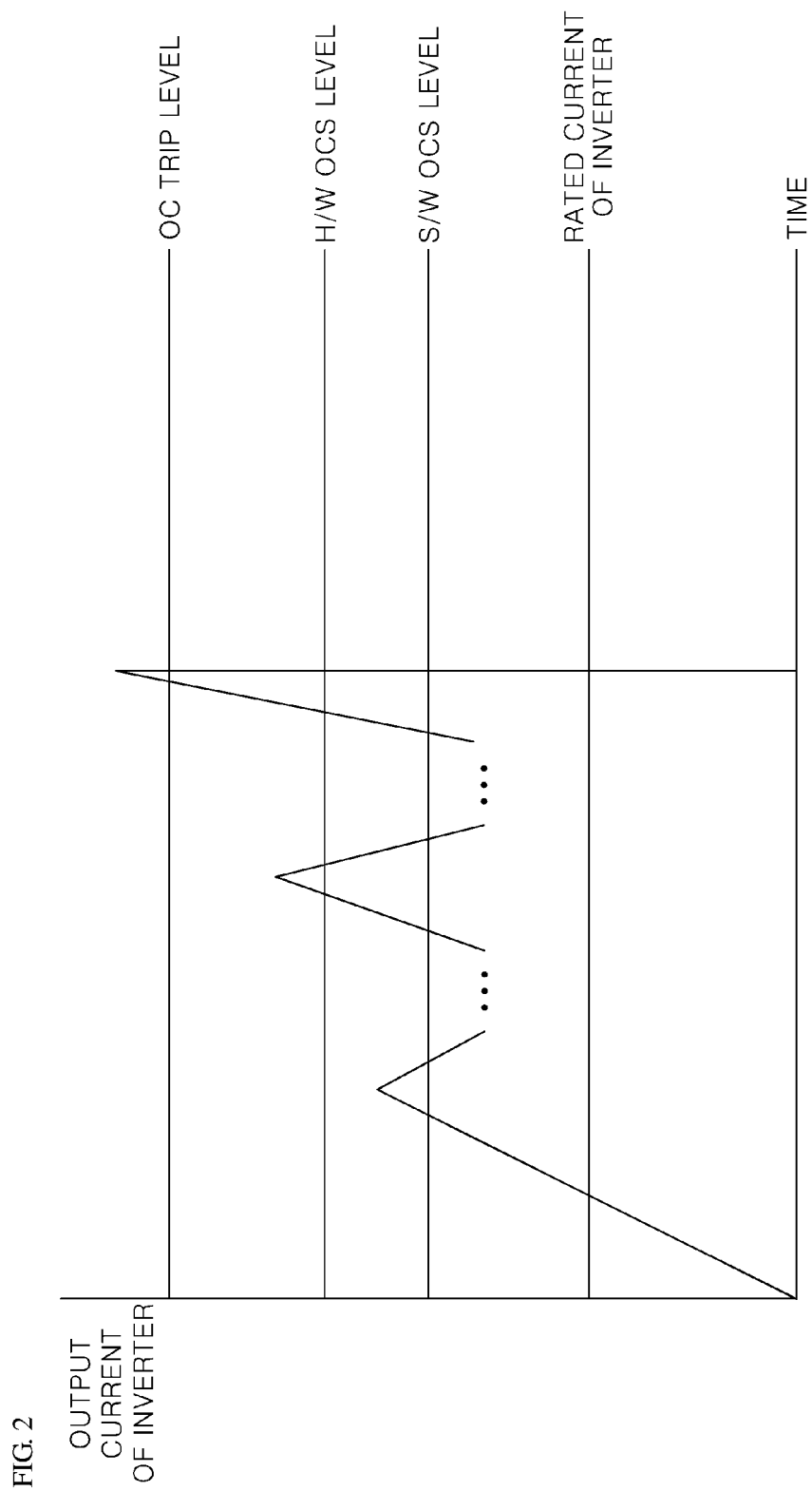
FIG. 2 illustrates a current level for describing an inverter control for an over-current protection.
Figure 3:
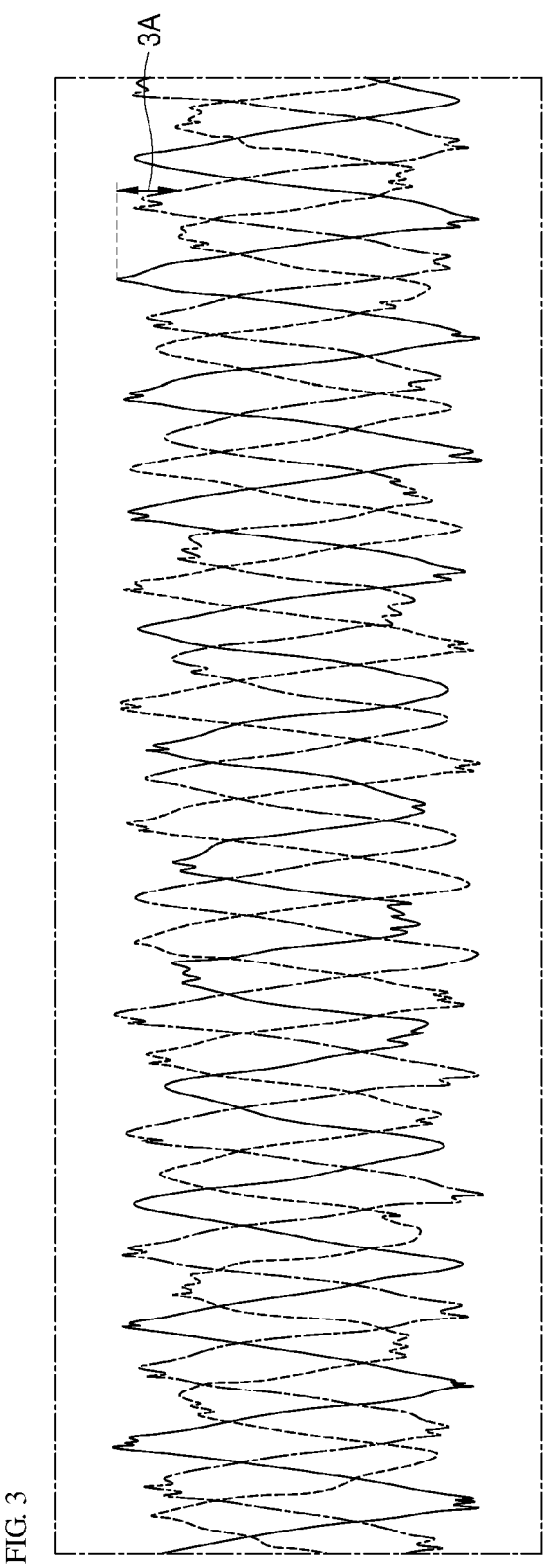
FIG. 3 is a waveform view for illustrating unbalance of an output current in a single-phase input type inverter.

Exemplary embodiments of the present disclosure will now be described in detail with reference to the accompanying drawings to facilitate understanding of the configuration and effects thereof. The scope of the present disclosure may, however, be embodied in many different forms and should not be construed as limited to the embodiments set forth herein. These embodiments are provided so that this disclosure will be thorough and complete, and will fully convey the scope of the inventive subject matter to those skilled in the art. In the drawings, the size of some of the elements may be exaggerated for convenience of illustration and not drawn on scale for illustrative purposes.

It will be understood that when an element such as a layer, region, substrate, or panel is referred to as being "on" or "connected to" another element, it can be directly on the other element or intervening elements may also be present. In contrast, when an element is referred to as being "directly on" or "directly connected to" another element, there are no intervening elements present. The same may be applied to other expressions for describing relationship between elements such as "between" and "directly between".

Terms such as first, second, etc. in the description and in the claims are used for distinguishing between similar elements and not necessarily for describing a sequential or chronological order. The terms are only used to differentiate one component from other components. For example, the terms so used are interchangeable under appropriate circumstances without departing from the scope of the present disclosure.

As used herein, the singular form of "a", "an", and "the" includes plural references unless the context clearly dictates otherwise. It will be further understood that the terms "comprises" or "have" used in this specification, specify the presence of stated features, steps, operations, components, parts, or a combination thereof, but do not preclude the presence or addition of one or more other features, numerals, steps, operations, components, parts, or a combination thereof.

The terms used herein, including technical terms, have the same meanings as terms that are generally understood by those skilled in the art, as long as the terms are not explicitly defined differently.

Hereinafter, exemplary embodiments of the present disclosure will be described in detail with reference to the accompanying drawings.

Figure 4:
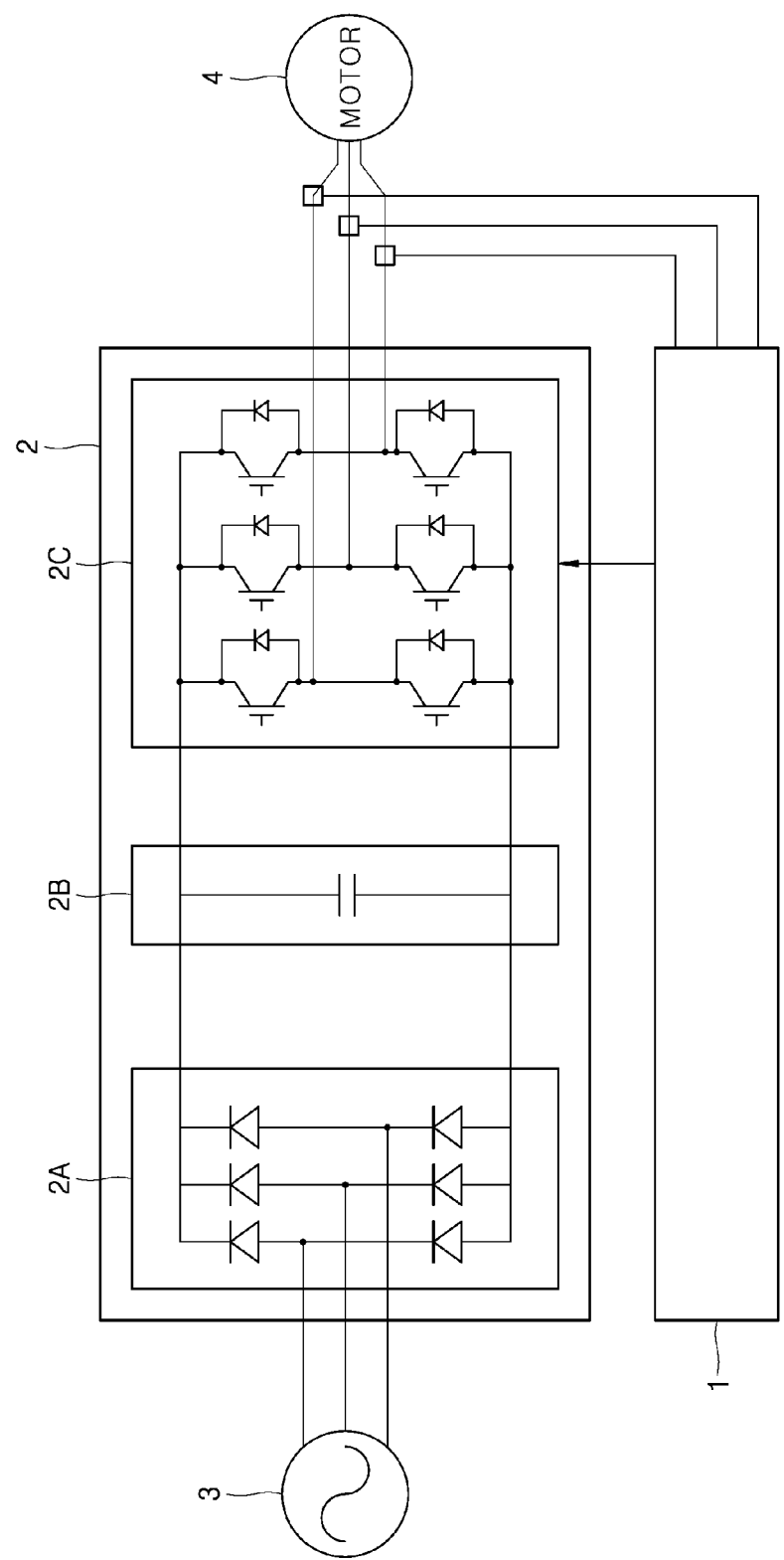
FIG. 4 is a configuration view schematically illustrating an inverter system to which a control apparatus according to an exemplary embodiment of the present disclosure is applied.

FIG. 4 is a configuration view schematically illustrating an inverter system to which a control apparatus according to an exemplary embodiment of the present disclosure is applied.

As illustrated in FIG. 4, in a system to which an exemplary embodiment of the present disclosure is applied, three-phase power 3 is applied to an inverter 2 and an output of the inverter 2 is applied to a motor 4, and when a three-phase output current of the inverter 2 is applied to a control apparatus 1, a PWM control signal may be output to an inverter unit 2C of the inverter 2.

The inverter 2 receives AC power from the three phase power, a rectifying unit 2A converts such an AC voltage into a DC voltage, a DC link capacitor 2B stores the DC voltage as a DC link voltage, and the inverter unit 2C then converts the DC link voltage into the AC voltage to output the AC voltage to the motor 4.

The PWM signal which is output from the control apparatus 1 may control a switching on/off of a plurality of switching elements of the inverter unit 2C to output the AC voltage having a predetermined output frequency to the motor 4.

Figure 5:
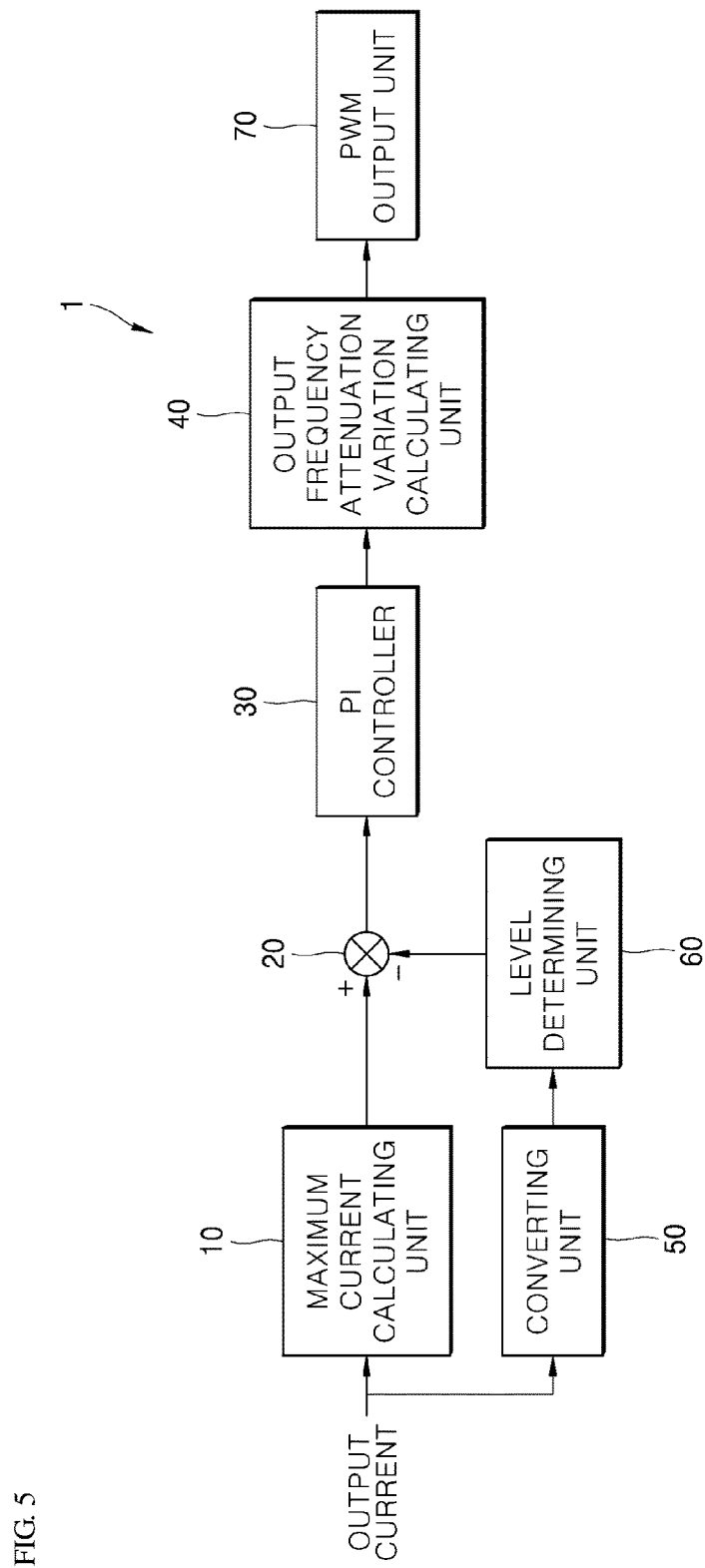
FIG. 5 is an illustrative view illustrating a control apparatus of the inverter according to an exemplary embodiment of the present disclosure.

FIG. 5 is an illustrative view illustrating a control apparatus of the inverter according to an exemplary embodiment of the present disclosure.

As illustrated in FIG. 5, the control apparatus according to an exemplary embodiment of the present disclosure may include a maximum current calculating unit 10, a level comparing unit 20, a proportional-integral (PI) controller 30, an output frequency attenuation variation calculating unit 40, a converting unit 50, and a level determining unit 60.

The maximum current calculating unit 10 may calculate a maximum current from an output current for each phase which is output from the inverter 2. Meanwhile, the converting unit 50 may convert the output current for each phase which is output from the inverter 2 into a DQ coordinate axis. The present disclosure is not limited thereto, however, the converting unit 50 may convert the three-phase output current into a two-phase output current (e.g., a α β coordinate axis). However, an example, in which the converting unit 50 converts the output current for each phase into the DQ coordinate axis will be described below.

The level determining unit 60 may determine a software over-current suppression (S/W OCS) operation level from the DQ converted output current, which is an average of three phases.

Figure 6:
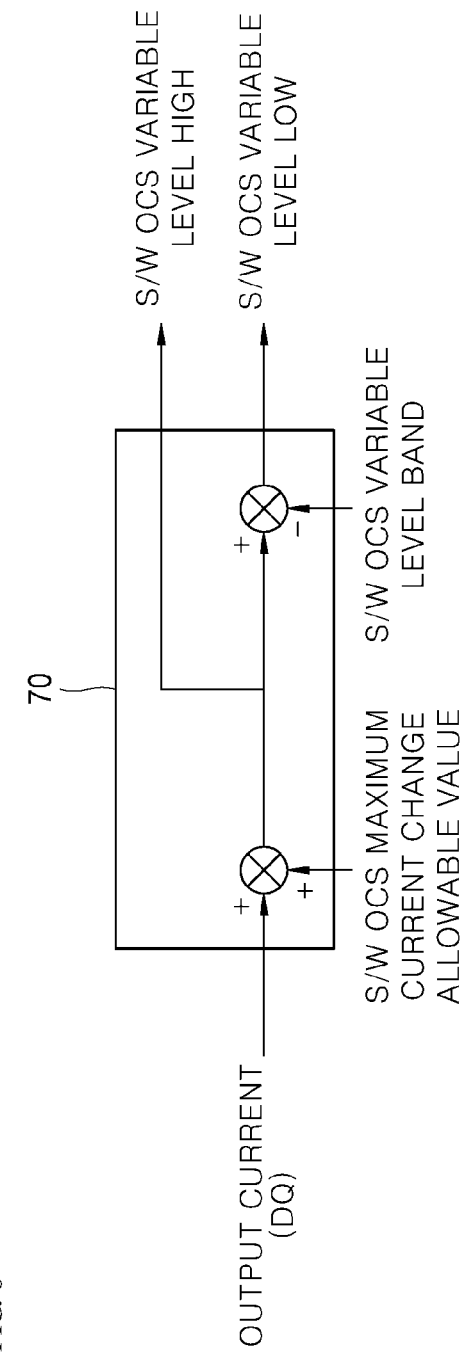
FIG. 6 is a concept view illustrating that a level determining unit of FIG. 5 determines a software over-current suppression operation level.

FIG. 6 is a concept view illustrating that the level determining unit of FIG. 5 determines the software over-current suppression (S/W OCS) operation level.

As illustrated in FIG. 6, an S/W OCS maximum current allowable value and an S/W OCS variable level band may be set in advance and stored in a determining unit 70. The determining unit 70 may determine S/W OCS variable level high by receiving the DQ converted output current of the inverter 2 and adding the S/W OCS maximum current change allowable value to the DQ converted output current, and may determine an S/W OCS variable level low by receiving the DQ converted output current of the inverter 2 and subtracting the S/W OCS variable level band from the DQ converted output current. Such a level determining unit 60 may be performed, for example, in a time interruption.

Referring again to FIG. 5, the level comparing unit 30 may determine a difference between the maximum current for each phase and the S/W OCS level. The PI controller 40 is to reduce error of an output of the level comparing unit 30, and is a combination of a proportional operation that flexibly approaches a target value and an integral operation in which fine error is accumulated and a control then starts when a predetermined value is exceeded. Since a general operation of the PI controller 40 is widely known, a detailed description thereof will be omitted.

As such, the output frequency attenuation variation calculating unit 50 may determine the difference between the maximum current for each phase and the S/W OCS level as an output frequency attenuation variation, and a PWM output unit 80 may generate a PWM control signal according to an output frequency and output the PWM control signal to the inverter unit 2C. The plurality of switching elements of the inverter unit 2C may output the AC voltage which is switched on or off by the PWM control signal to have a changed output frequency to the motor 4.

Figure 7:
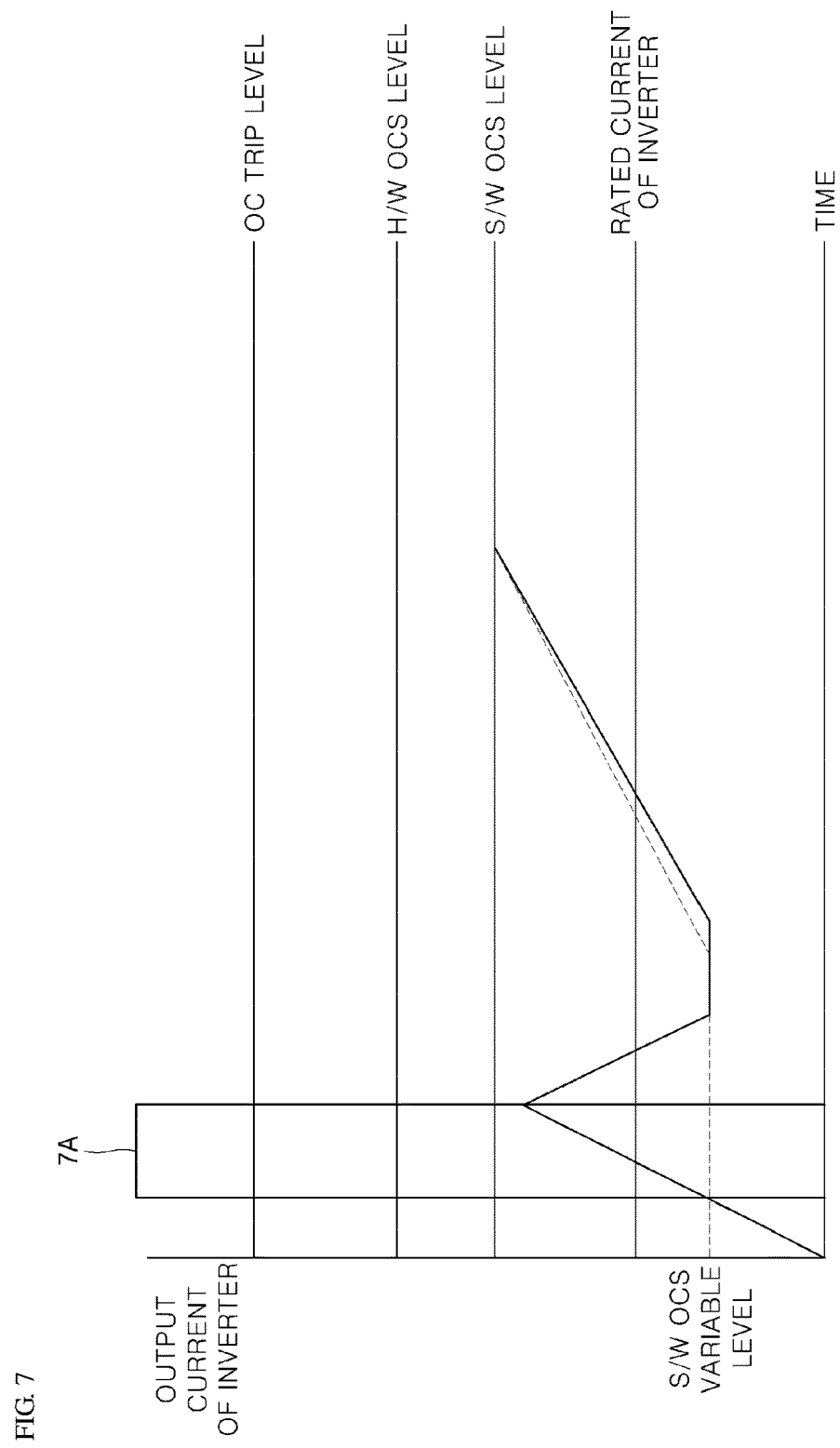
FIG. 7 is an illustrative view illustrating an operation of controlling a software over-current suppression operation according to an exemplary embodiment of the present disclosure.

FIG. 7 is an illustrative view illustrating an operation of controlling a software over-current suppression operation according to an exemplary embodiment of the present disclosure.

The control apparatus 1 according to an exemplary embodiment of the present disclosure may suppress an unnecessary output over-current of the inverter by variably operating the S/W OCS level according to the output current of the inverter. The S/W OCS operation level by the variable over-current suppression may be varied according to a level of the output current of the inverter, and when the output current is increased within a normal operation level, the S/W OCS operation level may be operated in proportion to the normal operation level. The S/W OCS operation level by the variable over-current suppression may be set in consideration of a filter constant of a current detecting circuit of the inverter, and a delay factor according to a current calculating time 7A.

Figure 8:
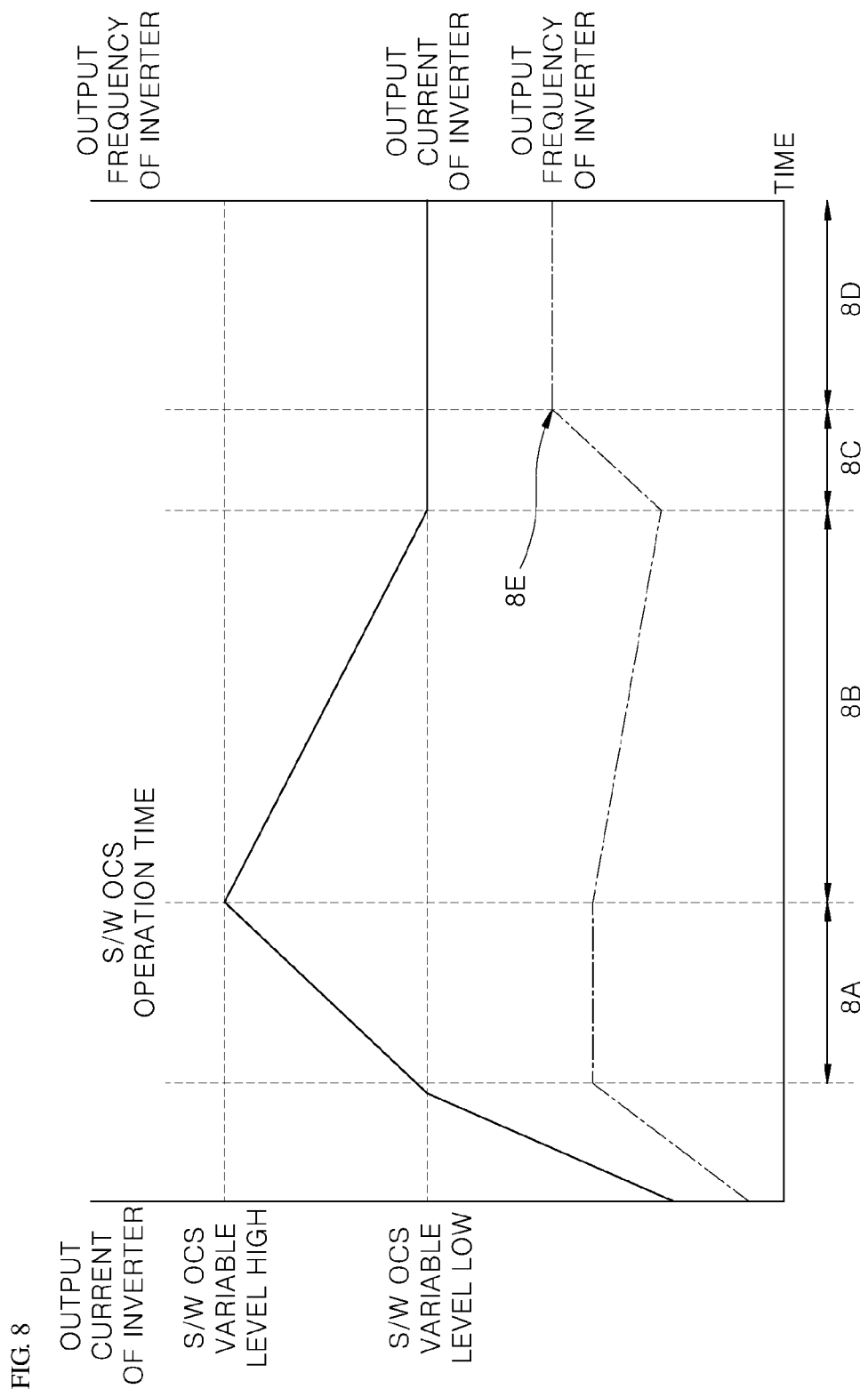
FIG. 8 is an illustrative view illustrating a method for adjusting an output frequency of an inverter according to an exemplary embodiment of the present disclosure.

FIG. 8 is an illustrative view illustrating a method for adjusting an output frequency of an inverter according to an exemplary embodiment of the present disclosure.

As illustrated in FIG. 8, the S/W OCS operation level for variable over-current suppression may include an S/W OCS variable level upper limit (HIGH) and an S/W OCS variable level lower limit (LOW), and the control apparatus 1 according to an exemplary embodiment of the present disclosure may adjust the output frequency of the inverter 2 according to a state of the output current.

In a section 8A in which the output current of the inverter 2 enters the S/W OCS variable level lower limit (LOW), the control apparatus 1 may fix the output frequency of the inverter to suppress an additional increase of the slip frequency of the motor 4 and to suppress the output current of the inverter 2.

In a section 8B in which the output current of the inverter 2 enters the S/W OCS variable level upper limit (HIGH), the output current of the inverter 2 may be attenuated by attenuating the output frequency of the inverter 2 to reduce the slip frequency of the motor 4. In this case, an S/W OCS HIGH flag for determining the attenuation of the output frequency of the inverter 2 may be set, and the output frequency of the inverter 2 may be attenuated until the output current of the inverter 2 drops to the S/W OCS variable level lower limit (LOW) or less. If the output current of the inverter 2 is the S/W OCS variable level or less, the S/W OCS HIGH flag may be reset.

In a section 8C in which the output current of the inverter 2 is reduced from the S/W OCS variable level upper limit (HIGH) to the S/W OCS variable level lower limit (LOW) or less, the output frequency of the inverter 2 may be increased according to a set acceleration time to be increased up to a target frequency level 8E.

In a second 8D in which the output current of the inverter 2 enters the S/W OCS variable level lower limit (LOW), the output frequency of the inverter may be maintained at the target frequency level 8E.

Figure 9:
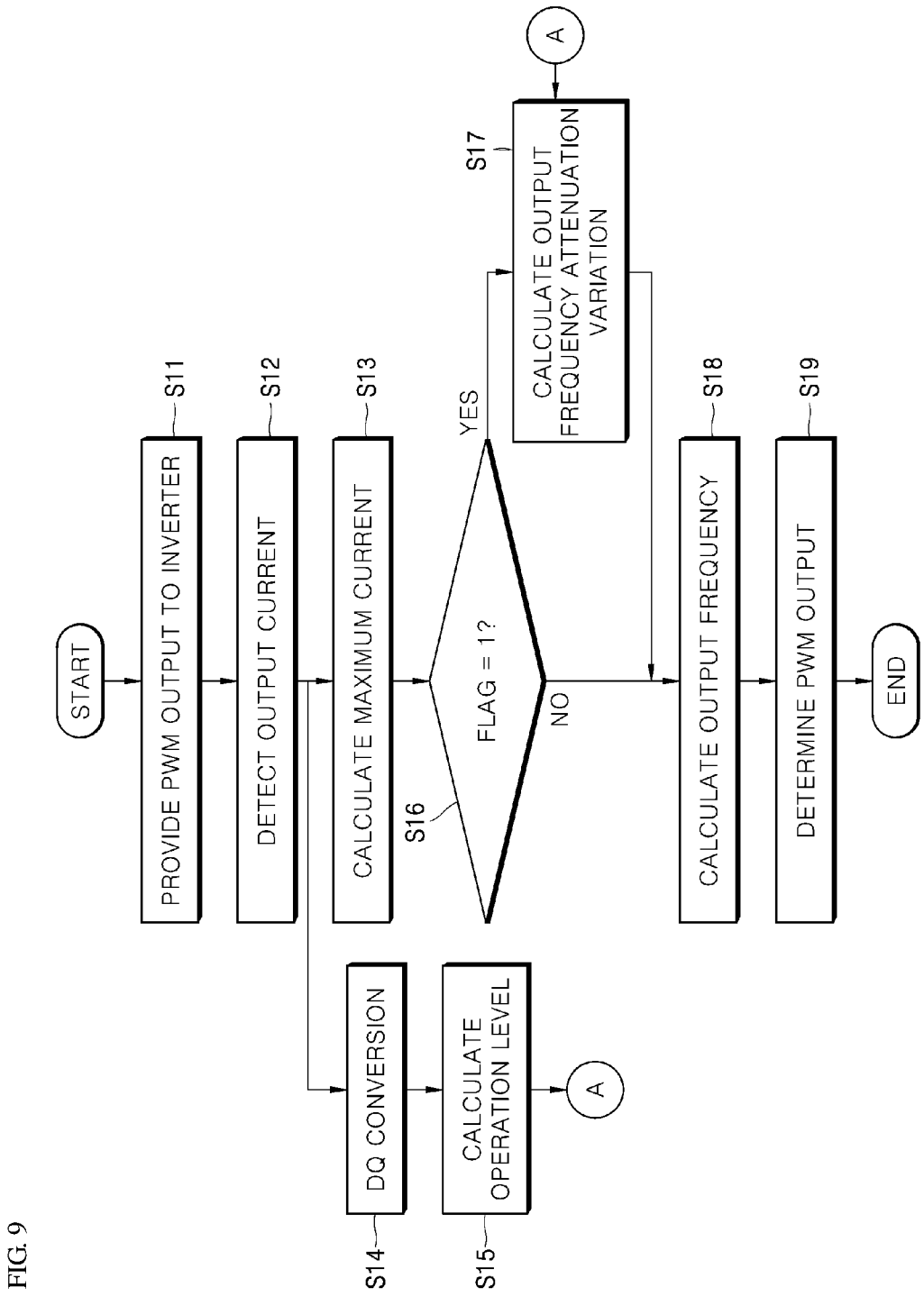
FIG. 9 is a flow chart illustrating a method for controlling an inverter according to an exemplary embodiment of the present disclosure.

FIG. 9 is a flow chart illustrating a method for controlling an inverter according to an exemplary embodiment of the present disclosure, and illustrates that the control apparatus 1 controls the S/W OCS operation.

As illustrated in FIG. 9, in the method for controlling the inverter according to an exemplary embodiment of the present disclosure, the inverter 2 is operated by the PWM output provided to the inverter 2 (S11), and as a result, when the output current of the inverter 2 is detected (S12), the maximum current calculating unit 10 may calculate the maximum current from the output current of each phase (S13). Whether or not the S/W OCS is operated is determined by the maximum current of the output current of each phase, and in a case in which the maximum current of the inverter 2 arrives the S/W OCS variable level upper limit (HIGH), the flag may be set to 1 (S16), and the output frequency attenuation variation may be calculated (S17).

In this case, the converting unit 50 performs the DQ conversion for the output current (S14).

Next, the level determining unit 70 may determine the S/W OCS variable level upper limit (HIGH) and the S/W OCS variable level lower limit (LOW) (S15) by adding the S/W OCS maximum current change allowable value to and subtracting the S/W OCS variable level band from the DQ converted output current.

Next, the S/W OCS variable level band determined as described above may be used for the determination of the output frequency attenuation variation (S17). That is, the output frequency attenuation variation calculating unit 40 may determine a difference between the maximum current for each phase and the S/W OCS variable level upper limit (HIGH) as the output frequency attenuation variation.

The output frequency may be calculated based on the attenuation variation determined as described above (S18).

In addition, in a case in which the maximum current of the inverter 2 is not the S/W OCS variable level upper limit (HIGH) in S16, the output frequency may be calculated without changing the output frequency (S18). That is, in the section 8A of FIG. 8, the output frequency may be output while maintaining the output frequency.

The PWM output unit 70 may output the PWM signal for outputting to the inverter unit 2C of the inverter 2 using the output frequency determined as described above (S19).

According to the exemplary embodiments of the present disclosure, when the S/W OCS by the variable over-current suppression is applied, the unnecessary increase of the output current of the inverter may be suppressed in the rapid acceleration operation in which the slip frequency of the motor is rapidly changed.

In addition, even in a situation in which the large inertia load in which the slip frequency of the motor according to the acceleration time is increased is applied, the inverter may be stably accelerated, and the control performance of the motor may be stably secured by continuously controlling the inverter by the S/W OCS operation by the variable over-current suppression.

As described above, according to the exemplary embodiments of the present disclosure, when the S/W OCS by the variable over-current suppression is applied, the unnecessary increase of the output current of the inverter may be suppressed in the rapid acceleration operation in which the slip frequency of the motor is rapidly changed.

In addition, according to the present disclosure, even in a situation in which the large inertia load in which the slip frequency of the motor according to the acceleration time is increased is applied, the inverter may be stably accelerated, and the control performance of the motor may be stably secured by continuously controlling the inverter by the S/W OCS operation by the variable over-current suppression.

Although the exemplary embodiments of the present disclosure have been described in detail, these are merely illustrative. It will be appreciated by those skilled in the art that various modifications and equivalents are possible without departing from the scope of the present disclosure. Accordingly, the true scope of the present disclosure sought to be protected is defined only by the appended claims.

What is claimed is:

1. A method for controlling an inverter of a control apparatus controlling the inverter, the method comprising:
    calculating a maximum current from an output current of each phase of the inverter;
    determining a variable level upper limit by performing a DQ conversion for the output current of each phase of the inverter and adding a change allowable value to the DQ converted output current;
    determining a difference between the maximum current for each phase and the variable level upper limit as an output frequency attenuation variation, when the output current of the inverter arrives at the variable level upper limit; and
    determining an output frequency based on the output frequency attenuation variation.

2. The method of claim 1, wherein the determining of the variable level upper limit further comprises determining a variable level lower limit by subtracting a variable level band from the variable level upper limit.

3. The method of claim 2, further comprising:
    maintaining the output frequency when the output current of the inverter is increased from the variable level lower limit to the variable level upper limit.

4. The method of claim 2, further comprising:
    increasing the output frequency according to a setting to be increased up to a target frequency level when the output current of the inverter is reduced to the variable level lower limit or less.

5. The method of claim 2, further comprising:
    maintaining the output frequency at a target frequency level, when the output current of the inverter maintains the variable level lower limit.

* * * * *